UNITED STATES PATENT OFFICE.

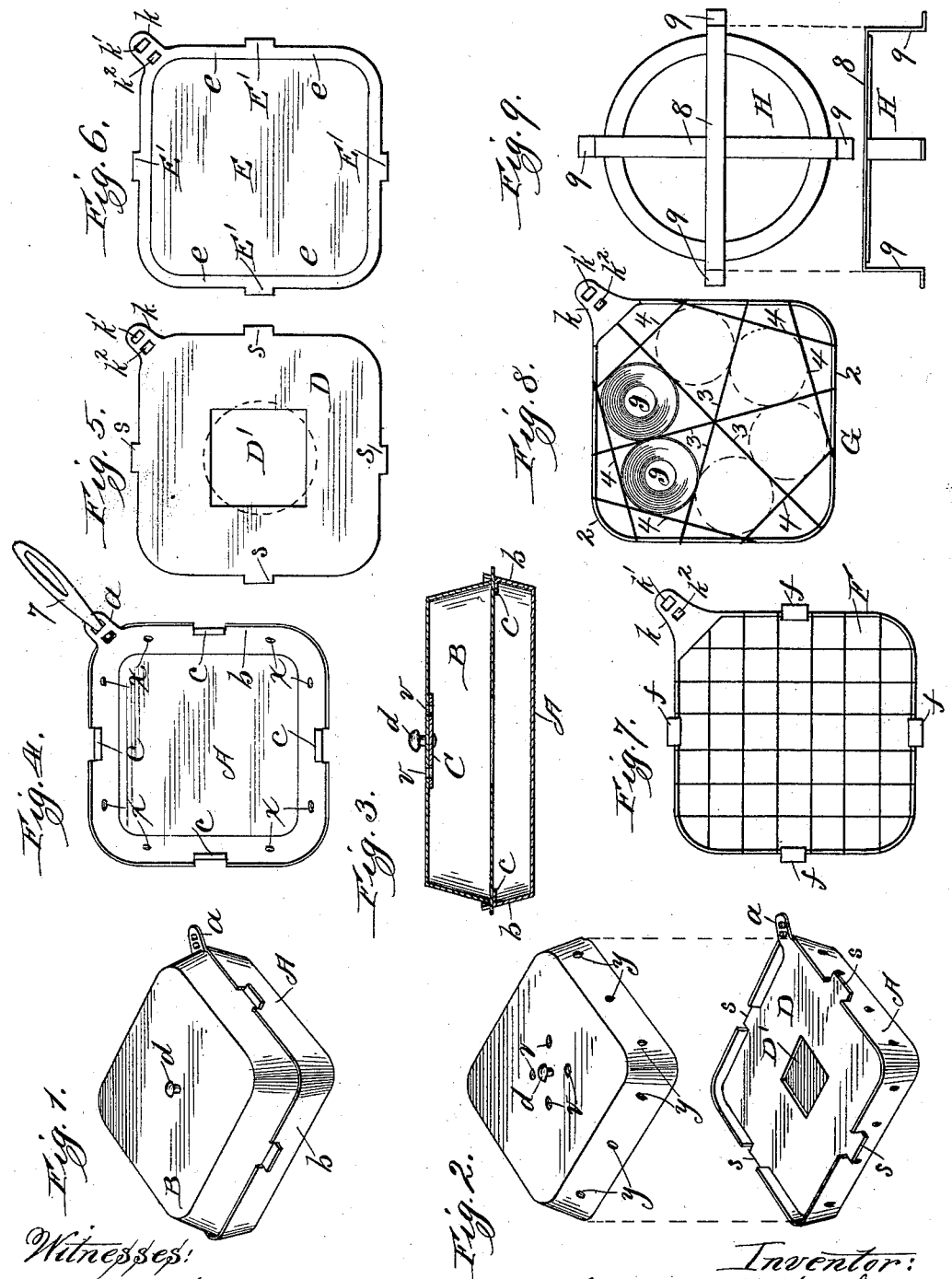

JOHN H. KUGHLER, OF CHICAGO, ILLINOIS.

COMBINATION-OVEN.

SPECIFICATION forming part of Letters Patent No. 613,043, dated October 25, 1898.

Application filed January 21, 1898. Serial No. 667,407. (No model.)

*To all whom it may concern:*

Be it known that I, JOHN H. KUGHLER, a citizen of the United States, and a resident of Chicago, Cook county, Illinois, have invented certain new and useful Improvements in a Combination-Oven for Broiling, Frying, Steaming, Toasting, Baking, and Roasting, of which the following is a full, clear, and exact description, reference being had to the accompanying drawings and to the letters and numerals of reference marked thereon.

My invention relates to combination cooking utensils; and its object is to provide an economical, easily-manipulated, and perfect-operating oven or inclosed utensil, the adaptability of which for cooking purposes is practically limitless, considering restricted capabilities of other culinary utensils. This I accomplish by the utensils constructed as hereinafter fully described, and as pointed out in the claim.

In the drawings, Figure 1 is a perspective view of my invention showing it closed. Fig. 2 is a perspective view of the same showing it open. Fig. 3 is a vertical central section therethrough. Fig. 4 is a plan view of the pan with the other parts removed. Fig. 5 is a plan view of a baking-platform attachment of my invention. Fig. 6 is a plan view of a broiler attachment therefor. Fig. 7 is a plan view of a toasting-frame attachment. Fig. 8 is a plan view of an attachment for poaching eggs. Fig. 9 is a plan view of an attachment for supporting pans when baking.

In the drawings, A represents a pan of suitable depth—say three inches—which may be of any suitable shape, but which I prefer to be of the rectangular shape shown, with all of its corners truncated or rounded, excepting one, which has an ear $a$ extending horizontally therefrom in alinement with the diagonal line intersecting said corner, which ear is provided with two slots or otherwise constructed to permit of its being lifted by the lifter hereinafter described. The sides $b$ of said pan are not perfectly perpendicular to the bottom thereof, but are slightly inclined outward, and about the center of length of the edge of each side is provided with parallel incisions placed near together, and the metal between them is bent inward horizontally to form corresponding tongues or brackets $c$, upon which the edges of the cover B or of any of the several interchangeable attachments used in conjunction with said pan and cover can rest. The sides of the pan can, if desired, be provided with a series of small openings $x\ x$, which preferably are arranged on a horizontal plane slightly below that of the tongues $c$. In Fig. 4 of the drawings the pan is shown with these openings $x$, and in the other figures they are omitted.

The cover B is of an inverted-pan shape, of about the same depth as pan A, but of slightly less horizontal dimensions, so that its edges can fit down within the edges and snugly against the sides of the pan and rest upon the tongues $c$ thereof. The sides of this cover may, if desired, be provided with a horizontally-arranged series of openings $y\ y$, as shown in Fig. 2 of the drawings. These may be omitted, however, without departing from the spirit of my invention. This cover is provided at about the center of its top with a suitable knob $d$ to grasp and lift the same, and if considered advisable a series of ventilating-holes $v\ v$ may be arranged around this knob, which can be opened or shut to regulate the escape of the heat by a suitable plate C, secured to the inner end of said knob and revoluble therewith, said plate having openings therein so located that when the plate is suitably turned said ventilating-holes will be opened; otherwise shut.

D represents a tray consisting of sheet metal. The transverse dimensions correspond to that of the inside of the pan, at about the horizontal plane of the tongues $c$ thereof, upon which it rests. If desired, however, while corresponding in transverse contours to said pan, it may be less in transverse dimensions than the same, so as to leave a surrounding space between its edges and the walls of the pan, and be provided with lugs $s\ s$, projecting from its side edges, so located as to rest upon tongues $c$ when placed in said pan. This tray D is adapted to be used in the baking of biscuit or cake, and as it is necessary for the heat to have free circulation both below and above it I provide it with a comparatively large hole $D'$ in its center, which may be square, as shown, or round or any other shape desired.

E represents a broiling or frying platform which is designed to be placed in said pan A.

It may be made of sheet metal or cast metal, and it conforms in shape to the transverse dimensions of the pan, taken at about the horizontal plane of tongues $c$ thereof, upon which it may rest, or it may be provided with lugs E', projecting from its sides, which when it is placed in pan A will rest on tongues $c$. If desired, this broiler or fryer E may be provided near its edges with openings $e$, which may be round, rectangular, or any other shape desired. These openings $e$ may be omitted, however.

F represents an open wirework frame which is adapted for toasting bread and the like. Its contours conform, likewise, to the transverse dimensions of that part of the pan A within which it is seated, and its edges may either be provided with lugs $f$, (similar to lugs E' of the broiler,) which will rest upon tongues $c$ of the pan, or its edges may rest directly upon said tongues.

G represents a wire frame, the wire 2 bounding which is bent to inclose an area corresponding in contours to the transverse dimensions of the pan A about the plane of tongues $c$. This area is crossed by several diametrically-arranged wires 3 and with several wires 4, arranged to describe a polygon having as many sides as there are spaces between wires 3, in conjunction with which they describe and inclose a quadrilateral kite-shaped opening, in each of which a shallow poaching pan or cup $g$ is placed and held by reason of its outwardly-flanged edges resting on said wires 3 and 4, as shown.

Tray D, broiler E, toaster F, and poaching-frame G are each constructed so they have an ear $k$ projecting from that corner thereof which when they are respectively placed in the pan A will aline with the corner from which ear $a$ thereof projects, and each of these ears $k$, similar to ear $a$, is provided with two suitable openings $k'$ $k^2$ therein, in which the curved end 6 of a suitable lifter 7 may be inserted to remove the attachment with which they are integrant whenever desired.

If desired, instead of providing the pan A with tongues $c$ to support the utensils used in conjunction therewith I can provide a simple frame H therefor, which can be inserted in the pan and the desired utensil placed thereon. This supporting-frame consists of two corresponding bars 8, crossing each other at right angles at about their centers of length and with their ends turned downward to a corresponding extent to provide suitable legs 9. Moreover, instead of said tongues $c$ said pan A may be provided simply with corresponding recesses at suitable points in its edges and the laterally-projecting lugs of said utensils be lengthened sufficiently to extend through said recesses. I desire to be considered as contemplating all such modifications as coming within the scope of my invention.

The operation of my invention is substantially as follows: The cover being removed, the desired utensil is placed within pan A, and then the cover is placed down within said pan and over said utensil, and thus make an oven which, as we have seen, may be ventilated or not, as desired, and eggs can be poached, and food can be prepared by steaming, broiling, baking, frying, toasting, or otherwise on any kind of a stove or over any kind of a fire without being smoked or burned and without creating any noxious smell. All this can be done by the use of my invention in a manner under the absolute control of the operator to accomplish the very best results possible in the culinary art.

What I claim as new is—

As an article of manufacture a culinary device consisting of a pan of suitable depth, having an ear projecting from one corner thereof, a cover of substantially the same depth which sets down in said pan, and a removable cooking utensil consisting of a flat frame supported in intermediate position between the bottom of said pan and the top of said cover and provided with an outwardly-projecting ear alining with the ear of said pan, as and for the purpose set forth.

JOHN H. KUGHLER.

Witnesses:
CHARLES ROSS,
FRANK D. THOMASON.